United States Patent
Kimura

(10) Patent No.: US 11,506,594 B2
(45) Date of Patent: Nov. 22, 2022

(54) SULFURIZATION DETECTION RESISTOR

(71) Applicant: KOA CORPORATION, Ina (JP)

(72) Inventor: Taro Kimura, Ina (JP)

(73) Assignee: KOA CORPORATION, Ina (JP)

( * ) Notice: Subject to any disclaimer, the term of this patent is extended or adjusted under 35 U.S.C. 154(b) by 224 days.

(21) Appl. No.: 17/112,493

(22) Filed: Dec. 4, 2020

(65) Prior Publication Data

US 2021/0199562 A1 Jul. 1, 2021

(30) Foreign Application Priority Data

Dec. 25, 2019 (JP) .............................. JP2019-234072

(51) Int. Cl.
| | |
|---|---|
| *G01N 17/04* | (2006.01) |
| *G01N 27/12* | (2006.01) |
| *H01C 1/142* | (2006.01) |
| *H01C 1/034* | (2006.01) |
| *H01C 13/02* | (2006.01) |
| *G01N 17/00* | (2006.01) |

(52) U.S. Cl.
CPC .......... *G01N 17/04* (2013.01); *G01N 27/122* (2013.01); *G01N 27/125* (2013.01); *H01C 1/034* (2013.01); *H01C 1/142* (2013.01); *G01N 17/006* (2013.01); *H01C 13/02* (2013.01)

(58) Field of Classification Search
CPC .... G01N 17/04; G01N 27/122; G01N 27/125; G01N 17/006; H01C 1/034; H01C 1/142; H01C 13/02; G01R 33/00; G01R 33/0035; G01R 33/0023; G01R 33/0017; G01R 31/3191; G01B 7/004; G01C 17/38; G06F 3/017; G06F 3/0346; G06F 3/012

See application file for complete search history.

(56) References Cited

U.S. PATENT DOCUMENTS

| | | | |
|---|---|---|---|
| 2016/0247610 A1* | 8/2016 | Shinoura | ................ H01C 1/142 |
| 2018/0174720 A1* | 6/2018 | Lee | ...................... H01C 17/281 |
| 2020/0066429 A1* | 2/2020 | Imahashi | ................. H01C 1/14 |

FOREIGN PATENT DOCUMENTS

JP          2009-250611 A          10/2009

* cited by examiner

*Primary Examiner* — Jermele M Hollington
*Assistant Examiner* — Taqi R Nasir
(74) *Attorney, Agent, or Firm* — Oliff PLC

(57) ABSTRACT

A sulfurization detection resistor includes: a rectangle-shaped insulating substrate; pair of front electrodes formed at both ends facing each other on a surface of the insulating substrate; plurality of sulfurization detection conductors arranged in parallel between the paired front electrodes; plurality of resistors connected between the ends of each of the sulfurization detection conductors and the paired front electrodes; and sulfide gas impermeable protective film that covers all of the resistors and some of the sulfurization detection conductors, wherein each of the sulfurization detection conductors has a sulfurization detection unit exposed from a window hole in the protective film; and by covering the sulfurization detection units with different types of sulfurization rate adjustment layers formed of an acrylic resin, a silicon resin, and the like, timing of disconnection is set so as to vary in response to a cumulative amount of sulfurization in each of the sulfurization detection units.

6 Claims, 4 Drawing Sheets

SULFURIZATION DETECTION RESISTOR

BACKGROUND OF THE INVENTION

(1) Field of the Invention

The present invention relates to a sulfurization detection resistor for detecting a cumulative amount of sulfurization in a corrosive environment.

(2) Description of the Related Art

An Ag (silver) based electrode material of a low resistivity is generally used as an internal electrode in an electronic component such as a chip resistor. Silver becomes silver sulfide when exposed to a sulfide gas and, since the silver sulfide is an insulator, a problem of disconnecting an electronic component occurs. In recent years, therefore, sulfurization countermeasures such as forming a hardly-sulfurized electrode by adding Pd (palladium) or Au (gold) to Ag or making an electrode configured to be hardly reached by a sulfide gas have been taken.

Even if such sulfurization countermeasures are taken for an electronic component, however, in the case of exposing the electronic component in a sulfide gas for a long period of time or in a sulfide gas of a high concentration, it becomes difficult to completely prevent disconnection, and hence it becomes necessary to detect disconnection before it happens and prevent an accident from occurring at an unexpected timing.

In this connection, as described in Japanese Unexamined Patent Application Publication No. 2009-250611, a sulfurization detection sensor that makes it possible to detect a cumulative degree of sulfurization in an electronic component and detect risks before the electronic component breaks down due to sulfurization disconnection or the like has heretofore been proposed.

The sulfurization detection sensor described in Japanese Unexamined Patent Application Publication No. 2009-250611 is configured so as to form a sulfurization detector mainly including Ag over an insulating substrate, form a transparent and sulfide gas permeable protective film so as to cover the sulfurization detector, and form end face electrodes connected to the sulfurization detector at the ends of the insulating substrate. After the sulfurization detection sensor configured in this way is mounted over a printed board together with other electronic components, if the printed board is used in an atmosphere containing a sulfide gas, the other electronic components are sulfurized, the sulfide gas permeates the protective film of the sulfurization detection sensor and touches the sulfurization detector with the lapse of time, and hence the color of the sulfurization detector changes in response to the concentration of the sulfide gas and the lapsed time. In this way, a degree of sulfurization is detected by visually observing change of the color of the sulfurization detector through the protective film, detecting the reflected light from the sulfurization detector of the light emitted to the upper surface of the sulfurization detection sensor, or detecting change of the resistance value of the sulfurization detector.

SUMMARY OF THE INVENTION

However, problems are that: color change of the sulfurization detector by a sulfide gas is subtle; hence it is difficult for a worker to accurately detect a degree of sulfurization visually; and, even though the degree of sulfurization is detected on the basis of light reflected from the sulfurization detector, large-scale equipment for the detection is required separately. Further, since the sulfurization detector is a conductor mainly including Ag of a low resistivity, the variation of the resistance value of the sulfurization detector accompanying a cumulative amount of sulfurization is very small and moreover, since Ag has a very poor temperature characteristic (TCR) and variation of the resistance value caused by temperature is large, it is also difficult to accurately detect a degree of sulfurization on the basis of the variation of the resistance value of the sulfurization detector.

The present invention is established in view of the actual situation of such conventional technology and an object of the present invention is to provide a sulfurization detection resistor that can detect a degree of sulfurization accurately and easily.

In order to attain the above object, a sulfurization detection resistor according to the present invention includes: a rectangle-shaped insulating substrate; a pair of front electrodes formed at both ends facing each other on a main surface of the insulating substrate; a plurality of sulfurization detection conductors arranged in parallel between the paired front electrodes; a plurality of resistors connected between at least one of the paired front electrodes and the sulfurization detection conductors; and a sulfide gas impermeable protective film that covers all of the resistors and some of the sulfurization detection conductors, wherein the sulfurization detection conductors have sulfurization detection units exposed from the protective film; and by selectively covering the sulfurization detection units with a sulfurization rate adjustment layer, timing of disconnection is set so as to vary in response to a cumulative amount of sulfurization in each of the sulfurization detection units.

In a sulfurization detection resistor configured in this way: a plurality of sets, each of which includes resistors and a sulfurization detection conductor connected in series, are connected in parallel between a pair of front electrodes; all of the resistors and some of the sulfurization detection conductors are covered with a sulfide gas impermeable protective film; each of the sulfurization detection conductors in the respective sets is set so as to vary timing of disconnection in response to a cumulative amount of sulfurization by selectively covering sulfurization detection units exposed from the protective film in the sulfurization detection conductors; hence the resistance values between the paired front electrodes change stepwise; and a degree of sulfurization can be detected accurately and easily.

In a sulfurization detection resistor of the above configuration, when a sulfurization rate adjustment layer includes a silicon resin that increases the sulfurization rate of a sulfurization detection unit, the sulfurization detection unit on the lower side is sulfurized fast by a sulfurizing component absorbed in the silicon resin, and hence timing of disconnection by a cumulative amount of sulfurization can be advanced in comparison with a sulfurization detection unit not covered with the silicon resin.

Further, in a sulfurization detection resistor of the above configuration, when a sulfurization rate adjustment layer includes a sulfide gas permeable resin (for example, an acrylic resin or a polyurethane resin) that decreases the sulfurization rate of a sulfurization detection unit, the sulfurization rate of the sulfurization detection unit on the lower side decreases by such a sulfide gas permeable resin, and hence it is possible to delay timing of disconnection by a cumulative amount of sulfurization in comparison with a sulfurization detection unit not covered with the sulfide gas permeable resin.

Furthermore, in a sulfurization detection resistor of the above configuration, when a protective film has isolation sections interposed between a plurality of sulfurization detection units arranged in parallel, even though the sulfurization detection units are covered with sulfurization rate adjustment layers different from each other, the isolation sections can surely prevent adjacent sulfurization rate adjustment layers from mixing with each other.

Moreover, in a sulfurization detection resistor of the above configuration, when precoat layers formed of a glass material are interposed between resistors and a protective film and ends of the precoat layers protrude from the protective film and define sulfurization detection units, even if print sagging (resin flow) occurs at the protective film formed of a resin material, such print sagging occurs over the precoat layers, and hence it is possible to set the sizes of the sulfurization detection units by the precoat layers with a high degree of accuracy.

In addition, in a sulfurization detection resistor of the above configuration, sulfurization detection conductors may have the same configuration formed collectively, otherwise at least the material compositions or film thicknesses of the sulfurization detection conductors may be different from each other, and on that occasion, by combining multiple types of sulfurization detection conductors and sulfurization rate adjustment layers, it is possible to increase variation in timing of disconnecting the sulfurization detection conductors in response to a cumulative amount of sulfurization in respective sets.

The present invention makes it possible to provide a sulfurization detection resistor that can detect a degree of sulfurization accurately and easily.

BRIEF DESCRIPTION OF THE DRAWINGS

Embodiments of the present invention will be described in detail based on the following figures, wherein.

DETAILED DESCRIPTION OF THE INVENTION

Figure 1:
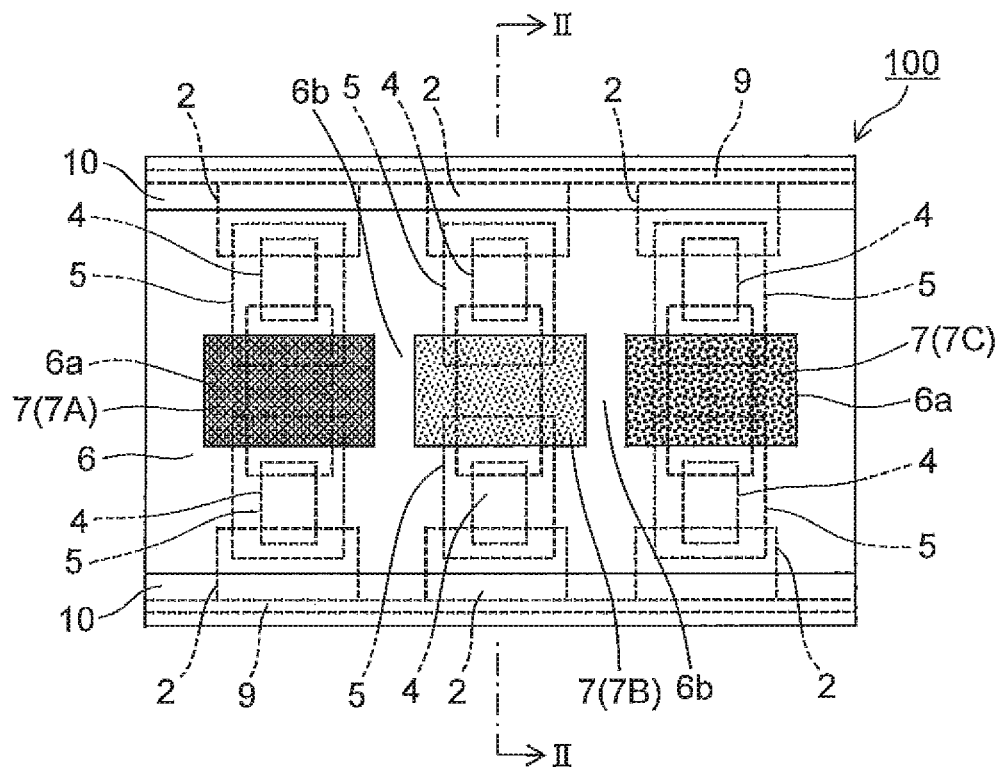
FIG. 1 is a plan view of a sulfurization detection resistor according to an embodiment of the present invention.

Embodiments according to the present invention are hereunder explained in reference to the drawings. FIG. 1 is a plan view of a sulfurization detection resistor according to an embodiment of the present invention and FIG. 2 is a sectional view taken on line II-II in FIG. 1.

Figure 2:
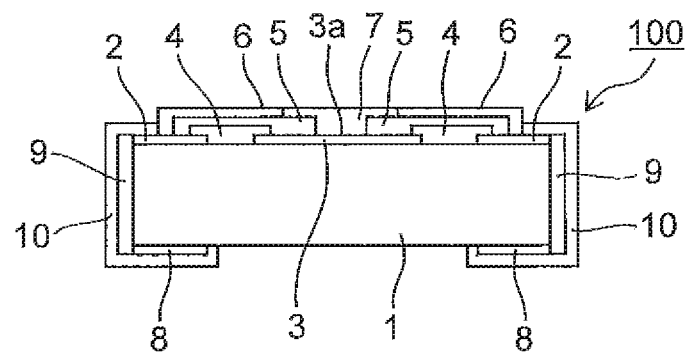
FIG. 2 is a sectional view taken on line II-II in FIG. 1.

As shown in FIG. 1 and FIG. 2, a sulfurization detection resistor 100 according to the present embodiment mainly includes: a rectangle-shaped insulating substrate 1; a plurality of pairs (three pairs, namely six in total, in the present embodiment) of front electrodes 2 provided at both ends facing each other in the longitudinal direction on a surface (main surface) of the insulating substrate 1; a plurality of (three) sulfurization detection conductors 3 provided between the respective paired front electrodes 2; a plurality of (six) resistors 4 connected between the respective sulfurization detection conductors 3 and corresponding front electrodes 2; precoat layers 5 to cover the respective resistors 4; a protective film 6 to cover all of the precoat layers 5 and some of the sulfurization detection conductors 3; a plurality of (three) sulfurization rate adjustment layers 7 to cover sulfurization detection units 3a exposed from the protective film 6 in the respective sulfurization detection conductors 3; a plurality of pairs (three pairs in the present embodiment) of rear electrodes 8 provided at both ends facing each other in the longitudinal direction on the rear surface of the insulating substrate 1; a pair of end face electrodes 9 provided on both end faces of the insulating substrate 1 in the longitudinal direction; and external electrodes 10 provided over the surfaces of the respective end face electrodes 9.

The insulating substrate 1 is one of many pieces taken out by dividing a large-format board that will be described later along the vertical and horizontal dividing grooves, and the principal component of the large-format board is a ceramic substrate containing alumina as the main component.

The front electrodes 2 are created by printing through screen print and drying and baking an Ag-based paste (for example, Ag—Pd 20%) containing silver as the main component, and those front electrodes 2 are formed along the long sides of the insulating substrate 1 at predetermined intervals. The paired rear electrodes 8 are also created by printing through screen print and drying and baking an Ag-based paste (for example, Ag—Pd 20%) containing silver as the main component, and those rear electrodes 8 are formed at positions corresponding to the front electrodes 2 on the surface side of the insulating substrate 1. Here, although three front electrodes 2 are arrayed in the isolated state along each of the long sides facing each other of the insulating substrate 1 in the sulfurization detection resistor 100 according to the present embodiment, those front electrodes 2 are not necessarily isolated into three pieces and may also be one continuous front electrode 2. The same also applies to the rear electrodes 8.

The three sulfurization detection conductors 3 are created by printing through screen print and drying and baking an Ag or Ag-based paste (for example, Ag—Pd 0.5%) containing silver as the main component and, as it will be described later, those sulfurization detection conductors 3 have the sulfurization detection units 3a that react with a sulfide gas and sulfurize.

The resistors 4 are created by printing through screen print and drying and baking a resistor paste including ruthenium oxide or the like and the resistance values of those resistors 4 are all set to the same value. The ends of the respective resistors 4 are connected to the front electrodes 2 and the sulfurization detection conductors 3, one sulfurization detection conductor 3 and two resistors 4 constitute a series circuit section, and those series circuit sections are connected in parallel between the paired front electrodes 2.

The precoat layers 5 are created by printing through screen print and drying and baking a glass paste and the respective resistors 4 are covered with the precoat layers 5. Here, the resistance values of the resistors 4 are adjusted if necessary by forming trimming grooves not shown in the figures in the resistors 4 from over the precoat layers 5. The precoat layers 5 extend to positions to cover the connection ends of the sulfurization detection conductors 3 and the resistors 4 and center parts not covered with but exposed from the precoat layers 5 of the sulfurization detection conductors 3 are the sulfurization detection units 3a.

The protective film 6 is created by printing through screen print and thermosetting an epoxy resin paste that is a sulfide gas impermeable resin material, and the respective resistors 4 are covered with the protective film 6. Three window holes 6a to expose the center some of the respective sulfurization detection conductors 3 are formed in the protective film 6, and the sulfurization detection units 3a in the sulfurization detection conductors 3 and ends of the precoat layers 5 are exposed respectively in the window holes 6a. The protective film 6 has isolation sections 6b interposed between adjacent window holes 6a, and the isolation sections 6b are formed in a band shape so as to isolate the three sulfurization detection units 3a exposed in the respective window holes 6a.

The three sulfurization detection units 3a exposed in the respective window holes 6a of the protective film 6 are covered with the sulfurization rate adjustment layers 7 respectively, and the three sulfurization rate adjustment layers 7 are created by printing through screen print and thermosetting different types of resin pastes that differentiate the sulfurization rates of the sulfurization detection units 3a. For convenience, the sulfurization rate adjustment layer covering the sulfurization detection unit 3a on the left side in FIG. 1 is designated by the reference numeral 7A and is called a first sulfurization rate adjustment layer, the sulfurization rate adjustment layer covering the sulfurization detection unit 3a in the center is designated by the reference numeral 7B and is called a second sulfurization rate adjustment layer, and the sulfurization rate adjustment layer covering the sulfurization detection unit 3a on the right side is designated by the reference numeral 7C and is called a third sulfurization rate adjustment layer. In the sulfurization detection resistor 100 according to the present embodiment, an acrylic resin material is used as the first sulfurization rate adjustment layer 7A, a polyurethane resin material is used as the second sulfurization rate adjustment layer 7B, and a silicon resin is used as the third sulfurization rate adjustment layer 7C.

Meanwhile, either of the acrylic resin and the polyurethane resin has the nature of decreasing the sulfurization rate of a sulfurization detection unit 3a on the lower side, but the acrylic resin can decrease the sulfurization rate of a sulfurization detection unit 3a more than the polyurethane resin because of a difference in sulfide gas permeability between the resins. On the other hand, the silicon resin has the nature of absorbing and retaining a sulfurizing component in a sulfide gas and hence can increase the sulfurization rate of a sulfurization detection unit 3a on the lower side by the absorbed sulfurizing component. In the case of the present embodiment, therefore, the sulfurization detection unit 3a covered with the third sulfurization rate adjustment layer 7C (silicon resin) is sulfurized fastest, successively the sulfurization detection unit 3a covered with the second sulfurization rate adjustment layer 7B (polyurethane resin) is sulfurized, and finally the sulfurization detection unit 3a covered with the first sulfurization rate adjustment layer 7A (acrylic resin) is sulfurized.

Meanwhile, the types, combinations, and the like of the respective sulfurization rate adjustment layers 7 (7A, 7B, and 7C) are not limited to the present embodiment and for example it is also possible to: use an epoxy resin and an elastomer resin other than the acrylic resin and the polyurethane resin as resins to decrease the sulfurization rate of a sulfurization detection unit 3a; and differentiate the sulfurization rates of the sulfurization detection units 3a by a difference in sulfide gas permeability of the respective sulfurization rate adjustment layers 7. Otherwise, by not covering only one sulfurization detection unit 3a with a sulfurization rate adjustment layer 7 and covering the other sulfurization detection units 3a with different types of sulfurization rate adjustment layers 7, it is possible to decrease/increase the sulfurization rates of the other sulfurization detection units 3a covered with the sulfurization rate adjustment layers 7 from the sulfurization rate of the sulfurization detection unit 3a not covered with a sulfurization rate adjustment layer 7.

The paired end face electrodes 9 are created by sputtering Ni/Cr or applying and thermosetting an Ag-based paste over the end faces of the insulating substrate 1 and those end face electrodes 9 are formed so as to electrically connect between the front electrodes 2 and the rear electrodes 8 aligned apart from each other on both the long sides facing each other of the insulating substrate 1. From an electrical point of view, therefore, the paired front electrodes 2 are arranged at the ends facing each other over the surface of the insulating substrate 1, and three series circuit sections including the sulfurization detection conductors 3 and the resistors 4 are connected in parallel between the paired front electrodes 2.

Each of the paired external electrodes 10 includes a two-layer structure of a barrier layer and an external connection layer. In the layers, the barrier layer is an Ni-plated layer formed by electrolytic plating, and the external connection layer is an Sn-plated layer formed by electrolytic plating. The surfaces of the front electrodes 2 exposed from the protective film 6 and the surfaces of the rear electrodes 8 and the end face electrodes 9 are covered with the external electrodes 10, respectively.

Successively, the manufacturing process of the sulfurization detection resistor 100 is explained in reference to FIG. 3 and FIG. 4. Here, FIGS. 3A to 3G represent plan views seen from above of a large-format board used in the manufacturing process, and FIGS. 4A to 4G represent sectional views equivalent to one chip taken on short direction center lines in FIGS. 3A to 3G, respectively.

Firstly, a large-format board from which many insulating substrates 1 are taken is prepared. A primary dividing groove and a secondary dividing groove are provided in a grid pattern over the large-format board in advance, and each of the squares partitioned by both the dividing grooves becomes a chip area. A large-format board 20A corresponding to one chip area is shown as a representative in FIGS. 3A to 3G, but actually each process explained below is applied collectively to a large-format board corresponding to a large number of chip areas.

Figure 3A:
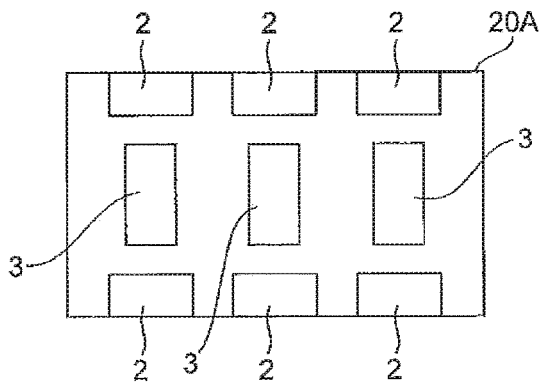
FIGS. 3A to 3G are plan views showing a manufacturing process of the sulfurization detection resistor.
Figure 4A:
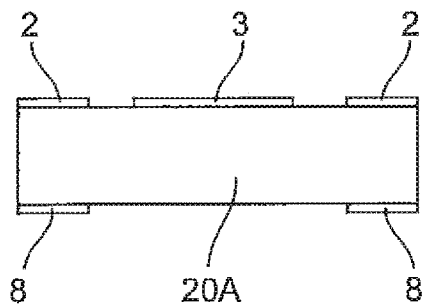
FIGS. 4A to 4G are sectional views showing the manufacturing process of the sulfurization detection resistor.

More specifically, as shown in FIG. 3A and FIG. 4A, a plurality of sets (three sets, namely six in total) of front electrodes 2, each set including two front electrodes 2 facing each other in the short direction of the chip area, and three sulfurization detection conductors 3 located between the paired front electrodes 2 are formed collectively by printing through screen print and then drying and baking an Ag-based paste over the surface of the large-format board 20A. Here, at the same time as this or before or after this, a plurality of rear electrodes 8 corresponding to the respective front electrodes 2 are formed by printing through screen print and then drying and baking an Ag-based paste over the rear surface of the large-format board 20A.

Figure 3E:
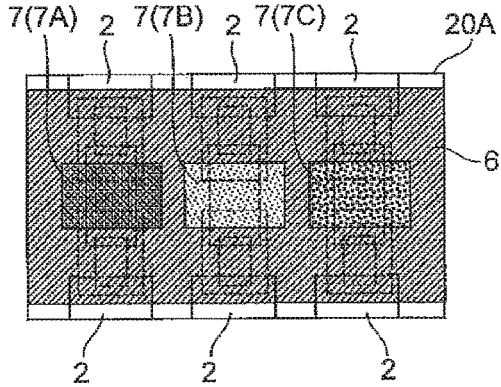
Figure 3B:
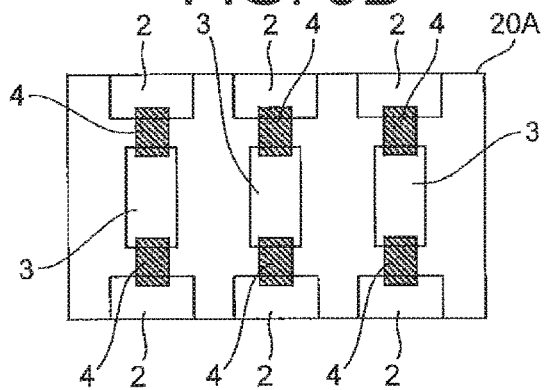
Figure 4E:
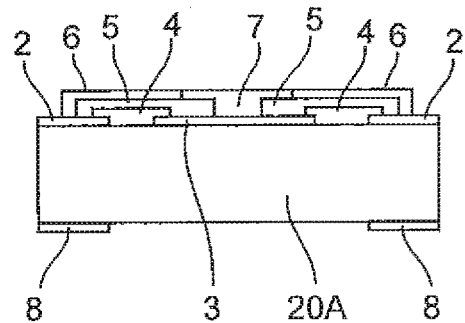
Figure 4B:
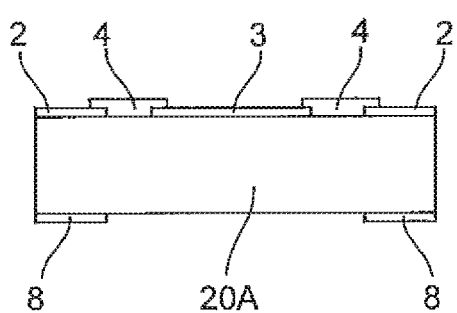

Successively, as shown in FIG. 3B and FIG. 4B, six resistors 4, the ends of each of which are connected to a sulfurization detection conductor 3 and a front electrode 2 respectively, are formed by printing through screen print and drying and baking a resistor paste such as ruthenium oxide.

Figure 3F:
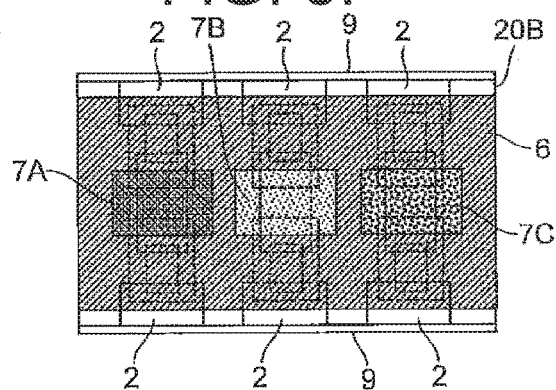
Figure 3C:
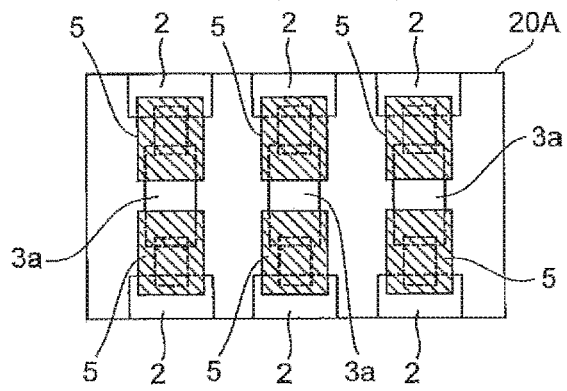
Figure 4F:
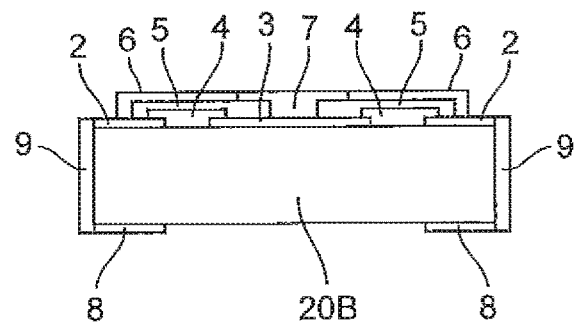
Figure 4C:
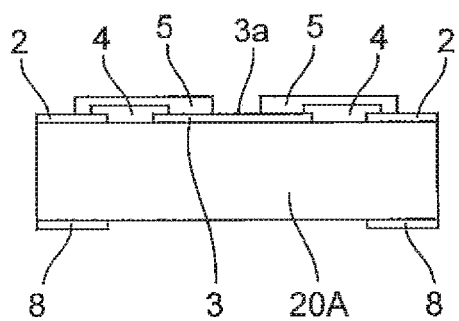

Successively, as shown in FIG. 3C and FIG. 4C, precoat layers 5 to cover the resistors 4 are formed by printing through screen print and drying and baking a glass paste and, if necessary, trimming groves not shown in the figures are formed in the resistors 4 from above the precoat layers 5, and the resistor values are adjusted. Here, each of the precoat layers 5 extends to a position of covering the connection end of a sulfurization detection conductor 3 and a resistor 4, and the center part of each of the sulfurization detection conductors 3 exposed from the paired precoat layers 5 becomes a sulfurization detection unit 3*a*. More specifically, the size (area) of a sulfurization detection unit 3*a* is defined by a pair of precoat layers 5 and, since the precoat layers 5 formed of a glass material are less likely to generate print sagging than a protective film formed of a resin, the size of the sulfurization detection unit 3*a* can be defined with a high degree of accuracy. Further, even if a sulfide gas intrudes through a gap between a sulfurization rate adjustment layer 7 and a protective film 6, those being formed at succeeding processes, the precoat layers 5 prevent the sulfurization rate adjustment layer 7 from being exposed directly to the sulfide gas, and hence it is possible to prevent unexpected disconnection.

Figure 3G:
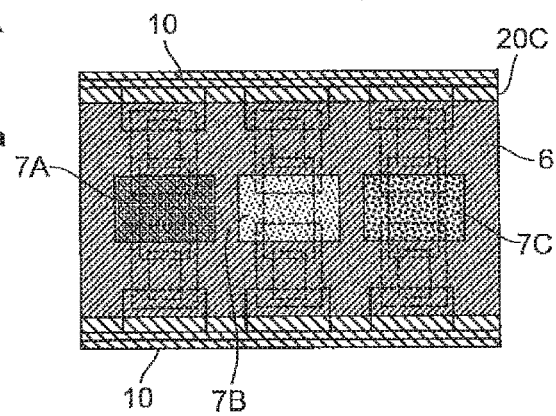
Figure 3D:
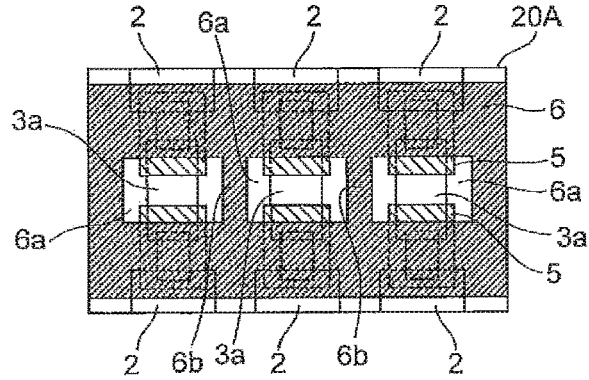
Figure 4G:
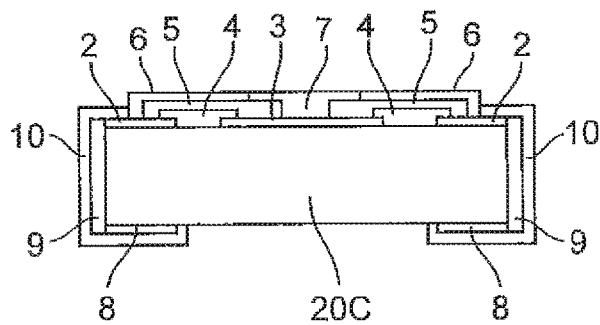
Figure 4D:
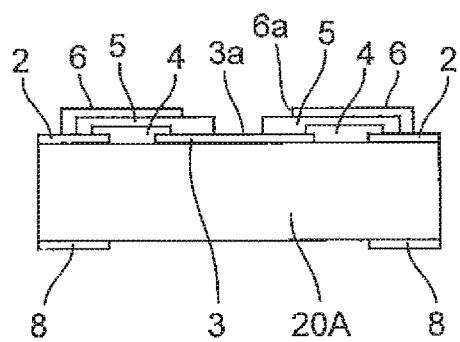

Successively, as shown in FIG. 3D and FIG. 4D, a protective film 6 of sulfide gas impermeability to cover some of the sulfurization detection conductors 3 and all of the resistors 4 is formed by printing through screen print and thermosetting an epoxy resin paste from over the precoat layers 5. Three window holes 6*a* to expose the sulfurization detection units 3*a* in the sulfurization detection conductors 3 are formed in the protective film 6, and isolation sections 6*b* of a band shape are formed between adjacent window holes 6*a*. The window holes 6*a* are formed so as to be larger than the end parts of the precoat layers 5 overlapping the sulfurization detection conductors 3 and, even if print sagging (resin flow) is generated in the protective film 6 formed of a resin material, such print sagging is generated only over the end parts of the precoat layers 5. The print sagging generated in the protective film 6 therefore never reaches the sulfurization detection units 3*a*, and the sizes of the sulfurization detection units 3*a* can be set by the precoat layers 5 not generating print sagging with a high degree of accuracy. Here, although the joints of the front electrodes 2 and the resistors 4 are also covered with the protective film 6, at this moment the other ends of the front electrodes 2 are not covered with and exposed from the protective film 6.

Successively, as shown in FIG. 3E and FIG. 4E, three sulfurization rate adjustment layers 7 (a first sulfurization rate adjustment layer 7A, a second sulfurization rate adjustment layer 7B, and a third sulfurization rate adjustment layer 7C) to individually cover the sulfurization detection units 3*a* exposed in the respective window holes 6*a* of the protective film 6 are formed by printing through screen print and thermosetting an acrylic resin paste, a polyurethane resin paste, and a silicon resin paste in random order. On this occasion, the isolation sections 6*b* are interposed between adjacent window holes 6*a* in the protective film 6, and hence the isolation sections 6*b* can surely prevent the resin pastes of the sulfurization rate adjustment layers 7 formed of different types of materials from mixing with each other. Here, the processes of printing through screen print and thermosetting predetermined resin pastes are required three times in the case of forming three types of sulfurization rate adjustment layers 7 in this way but, since the thermosetting temperatures of the resin pastes are low (about 200° C.) and the thermosetting times are also short (about 15 minutes), the sulfurization rate adjustment layers 7 can be formed easily.

Successively, as shown in FIG. 3F and FIG. 4F, after the large-format board 20A is primarily divided into a strip-shaped substrate 20B along a primary dividing groove, end face electrodes 9 connecting the front electrodes 2 with the rear electrodes 8 aligned apart from each other on both the long sides facing each other of the strip-shaped substrate 20B are formed by sputtering Ni/Cr over the divided surfaces of the strip-shaped substrate 20B. Here, it is also possible to form the end face electrodes 9 by applying and thermosetting an Ag-based paste instead of sputtering Ni/Cr over the divided faces of the strip-shaped substrate 20B.

Successively, the strip-shaped substrate 20B is secondarily divided into a plurality of chip-shaped substrates 20C along the secondary dividing groove and an Ni-plated layer and an Sn-plated layer are formed sequentially by applying electrolytic plating to the chip-shaped substrate 20C. As a result, as shown in FIG. 3G and FIG. 4G, external electrodes 10 are formed over the surfaces of the front electrodes 2 exposed from the protective film 6 and the surfaces of the rear electrodes 8 and the side face electrodes 9, and the sulfurization detection resistor 100 shown in FIGS. 1 and 2 is completed.

Figure 5:
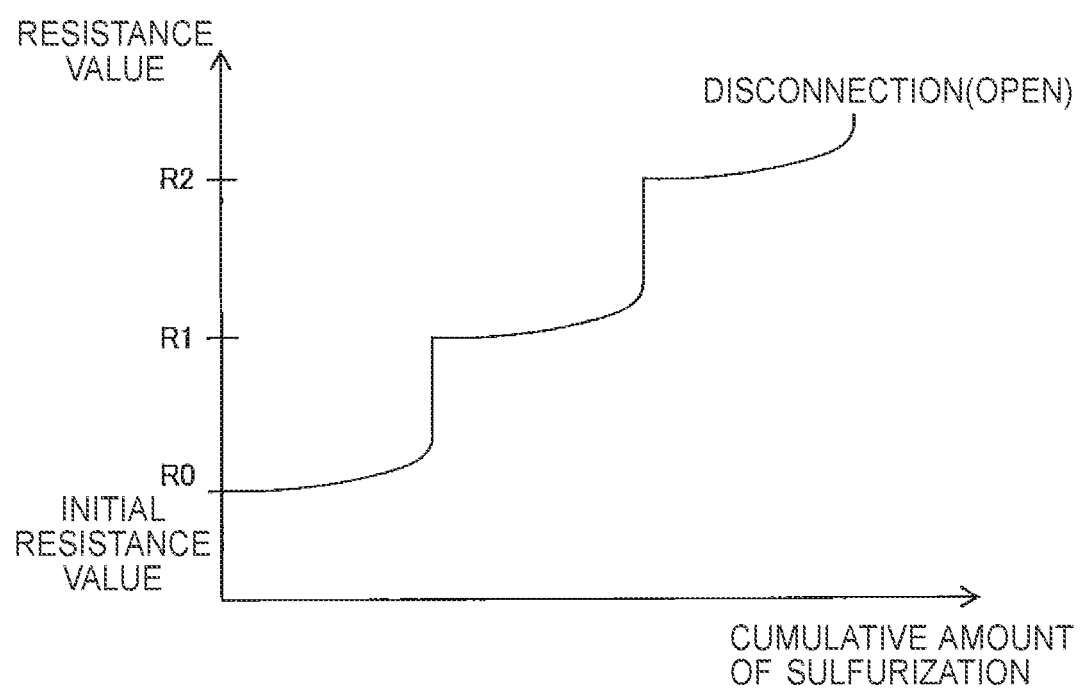
FIG. 5 is an explanatory view showing a relationship between a cumulative amount of sulfurization and a resistance value in the sulfurization detection resistor.

FIG. 5 is an explanatory view showing a relationship between a cumulative sulfurization amount and a resistance value in the case of arranging a sulfurization detection resistor 100 according to the present embodiment in a sulfide gas atmosphere. As shown in FIG. 5, since three series circuit sections, each series circuit section including two resistors 4 and one sulfurization detection conductor 3, are connected in parallel between pairs of front electrodes 2 in an initial state before the sulfurization detection resistor 100 is exposed to the sulfide gas, if the resistance value R of each resistor 4 is 500Ω for example, the initial resistance value R0 of the sulfurization detection resistor 100 is represented by the following expression;

$$R0=(2\times R/3)\approx 333\Omega.$$

When the sulfurization detection resistor 100 is arranged in an atmosphere containing a sulfide gas, three types of sulfurization rate adjustment layers 7 (a first sulfurization rate adjustment layer 7A, a second sulfurization rate adjustment layer 7B, and a third sulfurization rate adjustment layer 7C) covering sulfurization detection units 3*a* in the sulfurization detection conductors 3 come into contact with the sulfide gas, thus a cumulative sulfurization amount increases, and along with that the respective sulfurization detection units 3*a* are sulfurized stepwise. More specifically, since the third sulfurization rate adjustment layer 7C formed of a silicon resin has the nature of absorbing and retaining a sulfurizing component in the sulfide gas, firstly the sulfurization detection conductor 3 covered with the third sulfurization rate adjustment layer 7C is disconnected, and only the other two sulfurization detection conductors 3 covered with the first sulfurization rate adjustment layer 7A and the second sulfurization rate adjustment layer 7B conduct electricity. The sulfurization detection resistor 100 is therefore in the state of connecting the four resistors 4 connecting to the respective ends of those sulfurization detection conductors 3 in parallel between the paired front electrodes 2, and the resistance value R1 of the sulfurization detection resistor 100 is represented by the following expression;

$$R1=(2\times R/2)=500\Omega.$$

If the cumulative sulfurization amount further increases after the sulfurization detection conductor 3 covered with the third sulfurization rate adjustment layer 7C is disconnected in this way, the sulfurization detection conductor 3 with the smaller decrease in sulfurization rate in the other two sulfurization detection conductors 3 is disconnected. Specifically, since the first sulfurization rate adjustment layer 7A formed of an acrylic resin decreases the sulfurization rate of the sulfurization detection unit 3a more than the second sulfurization rate adjustment layer 7B formed of a polyurethane resin, the sulfurization detection conductor 3 covered with the second sulfurization rate adjustment layer 7B is disconnected and only the other sulfurization detection conductor 3 covered with the first sulfurization rate adjustment layer 7A conducts electricity. The sulfurization detection resistor 100 therefore is in the state of connecting only two resistors 4 connecting to the ends of the sulfurization detection conductor 3 covered with the first sulfurization rate adjustment layer 7A between the paired front electrodes 2, and the resistance value of the sulfurization detection resistor 100 becomes 2×R=1,000Ω (1 kΩ). Then if the cumulative sulfurization amount increases further and the sulfurization detection conductor 3 covered with the first sulfurization rate adjustment layer 7A is also disconnected, the resistance value of the sulfurization detection resistor 100 becomes in an open state.

Meanwhile, if it is inconvenient for a sulfurization detection resistor 100 to be in an open state in this way, it is acceptable to: cover a sulfurization detection conductor 3 in one series circuit section in a plurality of series circuit sections (sulfurization detection conductors 3 and resistors 4) connected in parallel between paired front electrodes 2 with a sulfide gas impermeable protective film; and cover the other sulfurization detection conductors 3 in all of the other series circuit sections with sulfurization rate adjustment layers 7. As a result of this, even after all of the sulfurization detection conductors 3 covered with the sulfurization rate adjustment layers 7 are disconnected stepwise, it is possible to retain the conduction state between the paired front electrodes 2 by the sulfurization detection conductor 3 covered with the sulfide gas impermeable protective film.

As it has been explained above: a sulfurization detection resistor 100 according to the present embodiment is configured so that a sulfurization detection conductor 3 and two resistors 4 connected in series constitute a series circuit section and a plurality of series circuit sections are connected in parallel between paired front electrodes 2; all of the resistors 4 and some of the sulfurization detection conductors 3 are covered with a sulfide gas impermeable protective film 6; and, by covering sulfurization detection units 3a in the sulfurization detection conductors 3 exposed from window holes 6a in the protective film 6 selectively with sulfurization rate adjustment layers 7 (a first sulfurization rate adjustment layer 7A, a second sulfurization rate adjustment layer 7B, and a third sulfurization rate adjustment layer 7C), the sulfurization detection conductors 3 in the respective series circuit sections are set so as to differentiate timing of disconnection by cumulative sulfurization amounts, hence a resistance value between the paired front electrodes 2 changes stepwise, and a degree of sulfurization can be detected accurately and easily.

Further, in a sulfurization detection resistor 100 according to the present embodiment: a first sulfurization rate adjustment layer 7A and a second sulfurization rate adjustment layer 7B in several types of sulfurization rate adjustment layers 7 covering sulfurization detection units 3a are formed of resin materials having sulfide gas permeability such as an acrylic resin and a polyurethane resin; the sulfurization rates of the sulfurization detection units 3a covered with the first sulfurization rate adjustment layer 7A and the second sulfurization rate adjustment layer 7B decrease; and hence it is possible to change disconnection timing of corresponding sulfurization detection units 3a on the basis of a difference in sulfide gas permeability between the first sulfurization rate adjustment layer 7A and the second sulfurization rate adjustment layer 7B or delay disconnection timing in comparison with a sulfurization detection unit 3a not covered with the sulfurization rate adjustment layers 7.

Furthermore, in a sulfurization detection resistor 100 according to the present embodiment: of several types of sulfurization rate adjustment layers 7 covering sulfurization detection units 3a, a third sulfurization rate adjustment layer 7C is formed of a silicon resin to increase the sulfurization rate of a sulfurization detection unit 3a; the sulfurization detection unit 3a on the lower side is sulfurized fast by a sulfurizing component absorbed in the silicon resin; and hence it is possible to advance disconnection timing in comparison with sulfurization detection units 3a covered with a first sulfurization rate adjustment layer 7A and a second sulfurization rate adjustment layer 7B and a sulfurization detection unit 3a not covered with the sulfurization rate adjustment layers 7.

Moreover, in a sulfurization detection resistor 100 according to the present embodiment, since window holes 6a to expose sulfurization detection units 3a arranged in parallel are formed and band-shaped isolation sections 6b interposed between adjacent window holes 6a are formed in a protective film 6, when sulfurization rate adjustment layers 7 (a first sulfurization rate adjustment layer 7A, a second sulfurization rate adjustment layer 7B, and a third sulfurization rate adjustment layer 7C) individually covering the sulfurization detection units 3a exposed in the respective window holes 6a are formed, the isolation sections 6b can surely prevent resin pastes formed of different types of materials in the sulfurization rate adjustment layers 7 from mixing with each other.

In addition, in a sulfurization detection resistor 100 according to the present embodiment, since precoat layers 5 formed of a glass material are interposed between resistors 4 and a protective film 6 and end parts of the precoat layers 5 protrude from the protective film 6 into window holes 6a and define sulfurization detection units 3a, it is possible to set the sizes of the sulfurization detection units 3a with a high degree of accuracy while preventing the sizes of the sulfurization detection units 3a from varying by print sagging (resin flow) of the protective film 6 formed of a resin material.

Meanwhile, the number of series circuit sections, each of which includes a sulfurization detection conductor 3 and two resistors 4, connected in parallel between paired front electrodes 2 is not limited to three as in the present embodiment and may also be two or even four or more. Further, although it is configured so as to cover all of sulfurization detection units 3a in sulfurization detection conductors 3 in respective series circuit sections with sulfurization rate adjustment layers 7 in the present embodiment, not all of sulfurization detection units 3a need to be covered with sulfurization rate adjustment layers 7 and, for example, it is also possible: to cover one of two sulfurization detection units 3a with a sulfurization rate adjustment layer 7 formed of an acrylic resin or a silicon resin; and not to cover the other sulfurization detection unit 3a with a sulfurization rate adjustment layer 7 and to expose the other sulfurization detection unit 3a to the exterior. Furthermore, although a series circuit section is configured by connecting two resistors 4 to the ends of a sulfurization detection conductor 3 in the above embodiment, it is also possible to eliminate a resistor 4 on one side and make a sulfurization detection conductor 3 and a resistor 4 constitute a series circuit section.

Furthermore, although multiple sulfurization detection conductors 3 are formed collectively through an identical process and hence all of the material compositions and the thicknesses of the sulfurization detection conductors 3 are identical in the above embodiment, at least the material compositions or the thicknesses of the sulfurization detection conductors 3 may different from each other. In this manner, several types of sulfurization detection conductors 3 themselves have sulfurization rates different from each other, and hence it is possible to increase variations of disconnection timing in the sulfurization detection conductors 3 in respective series circuit sections by combining several types of sulfurization detection conductors 3 and several types of sulfurization rate adjustment layers 7.

DESCRIPTION OF THE REFERENCE NUMERALS

1 insulating substrate
2 front electrode
3 sulfurization detection conductor
3*a* sulfurization detection unit
4 resistor
5 precoat layer
6 protective film
6*a* window hole
6*b* isolation section
7 sulfurization rate adjustment layer
7A first sulfurization rate adjustment layer
7B second sulfurization rate adjustment layer
7C third sulfurization rate adjustment layer
8 rear electrode
9 end face electrode
10 external electrode
100 sulfurization detection resistor

What is claimed is:

1. A sulfurization detection resistor comprising:
    a rectangle-shaped insulating substrate;
    a pair of front electrodes formed at both ends facing each other on a main surface of the insulating substrate;
    a plurality of sulfurization detection conductors arranged in parallel between the paired front electrodes;
    a plurality of resistors connected between at least one of the paired front electrodes and the sulfurization detection conductors; and
    a sulfide gas impermeable protective film that covers all of the resistors and some of the sulfurization detection conductors,
    wherein the sulfurization detection conductors have sulfurization detection units exposed from the protective film; and
    by selectively covering each of the sulfurization detection units with a sulfurization rate adjustment layer, timing of disconnection is set so as to vary in response to a cumulative amount of sulfurization in each of the sulfurization detection units.

2. The sulfurization detection resistor according to claim 1, wherein the sulfurization rate adjustment layer is formed of a silicon resin that increases a sulfurization rate of the sulfurization detection unit.

3. The sulfurization detection resistor according to claim 1, wherein the sulfurization rate adjustment layer is formed of a sulfide gas permeable resin that decreases a sulfurization rate of the sulfurization detection unit.

4. The sulfurization detection resistor according to claim 1, wherein the protective film has isolation sections interposed between the sulfurization detection units arranged in parallel.

5. The sulfurization detection resistor according to claim 1,
    wherein precoat layers formed of a glass material are interposed between the resistors and the protective film; and
    ends of the precoat layers protrude from the protective film and define the sulfurization detection units.

6. The sulfurization detection resistor according to claim 1, wherein at least the material compositions or film thicknesses of the sulfurization detection conductors are different from each other.

* * * * *